(12) United States Patent
Alameh et al.

(10) Patent No.: US 8,542,186 B2
(45) Date of Patent: Sep. 24, 2013

(54) MOBILE DEVICE WITH USER INTERACTION CAPABILITY AND METHOD OF OPERATING SAME

(75) Inventors: Rachid Alameh, Crystal Lake, IL (US); Thomas Merrell, Beach Park, IL (US); Kenneth Paitl, West Dundee, IL (US)

(73) Assignee: Motorola Mobility LLC, Libertyville, IL (US)

( * ) Notice: Subject to any disclaimer, the term of this patent is extended or adjusted under 35 U.S.C. 154(b) by 641 days.

(21) Appl. No.: 12/641,830

(22) Filed: Dec. 18, 2009

(65) Prior Publication Data

US 2011/0148752 A1 Jun. 23, 2011

Related U.S. Application Data

(63) Continuation-in-part of application No. 12/471,062, filed on May 22, 2009, now Pat. No. 8,304,733.

(51) Int. Cl.
*G06F 3/01* (2006.01)

(52) U.S. Cl.
USPC ................ 345/156; 324/115; 715/784

(58) Field of Classification Search
None
See application file for complete search history.

(56) References Cited

U.S. PATENT DOCUMENTS

| | | | |
|---|---|---|---|
| 4,286,289 A | 8/1981 | Ottesen et al. | |
| 4,806,709 A | 2/1989 | Evans | |
| 4,914,624 A | 4/1990 | Dunthorn | |
| 4,967,083 A | 10/1990 | Kornbrekke et al. | |
| 5,179,369 A | 1/1993 | Person et al. | |
| 5,414,413 A | 5/1995 | Tamaru et al. | |
| 5,684,294 A | 11/1997 | Kouhi | |
| 5,781,662 A | 7/1998 | Mori et al. | |
| 5,793,486 A | 8/1998 | Gordon et al. | |
| 5,821,521 A | 10/1998 | Bridgelall et al. | |
| 5,945,988 A | 8/1999 | Williams et al. | |
| 6,002,427 A | 12/1999 | Kipust | |
| 6,107,994 A | 8/2000 | Harada et al. | |
| 6,147,677 A | 11/2000 | Escobosa et al. | |
| 6,184,538 B1 | 2/2001 | Bandara et al. | |
| 6,185,950 B1 | 2/2001 | Baruschke et al. | |

(Continued)

FOREIGN PATENT DOCUMENTS

| | | |
|---|---|---|
| EP | 1445922 A1 | 8/2004 |
| EP | 1553427 A1 | 7/2005 |

(Continued)

OTHER PUBLICATIONS

United States Patent and Trademark Office, "Non-Final Office Action" for U.S. Appl. No. 12/347,146, Jul. 18, 2011, 9 pages.

(Continued)

*Primary Examiner* — Van Chow

(57) ABSTRACT

In one embodiment a method of operating a mobile device includes sensing either an orientation or a movement of the mobile device, determining a command based on the sensed orientation or sensed movement, sensing a proximity of an object in relation to at least a portion of the mobile device, and executing the command upon the proximity of the object being sensed. In another embodiment, a method of operating a mobile device governs a manner of interaction of the mobile device relative to one or more other mobile devices. In at least some embodiments, at least one of the mobile devices includes an accelerometer and an infrared proximity sensor, and operation of the mobile device is determined based upon signals from those components.

10 Claims, 8 Drawing Sheets

(56) References Cited

U.S. PATENT DOCUMENTS

| | | | |
|---|---|---|---|
| 6,215,116 B1 | 4/2001 | Van Marcke |
| 6,246,407 B1 | 6/2001 | Wilks et al. |
| 6,246,862 B1 | 6/2001 | Grivas |
| 6,292,674 B1 | 9/2001 | Davis |
| 6,330,457 B1 | 12/2001 | Yoon |
| 6,438,752 B1 | 8/2002 | McClard |
| 6,460,183 B1 | 10/2002 | Van Der Vleuten |
| 6,517,257 B2 | 2/2003 | Tohmon et al. |
| 6,525,854 B1 | 2/2003 | Takahashi et al. |
| 6,666,081 B1 | 12/2003 | Babinsky et al. |
| 6,681,056 B1 | 1/2004 | Tseng et al. |
| 6,721,954 B1 | 4/2004 | Nickum |
| 6,804,012 B2 | 10/2004 | Gombert |
| 6,816,154 B2 | 11/2004 | Wong et al. |
| 6,925,413 B2 | 8/2005 | Krieg et al. |
| 6,933,922 B2 | 8/2005 | Casebolt et al. |
| 6,941,161 B1 | 9/2005 | Bobisuthi et al. |
| 7,012,637 B1 | 3/2006 | Blume et al. |
| 7,046,230 B2 | 5/2006 | Zadesky et al. |
| 7,134,092 B2 | 11/2006 | Fung et al. |
| 7,166,966 B2 | 1/2007 | Naugler, Jr. et al. |
| 7,212,835 B2 | 5/2007 | Mantyjarvi et al. |
| 7,220,958 B2 | 5/2007 | Kitamura et al. |
| 7,224,382 B2 | 5/2007 | Baker |
| 7,237,929 B2 | 7/2007 | Stahl |
| 7,324,671 B2 | 1/2008 | Li et al. |
| 7,339,580 B2 | 3/2008 | Westerman et al. |
| 7,340,077 B2 | 3/2008 | Gorturk et al. |
| 7,368,703 B2 | 5/2008 | De Samber et al. |
| 7,380,716 B2 | 6/2008 | Yokoyama |
| 7,468,689 B2 | 12/2008 | Ma et al. |
| 7,486,386 B1 | 2/2009 | Holcombe et al. |
| 7,489,297 B2 | 2/2009 | Hohmann et al. |
| 7,515,177 B2 | 4/2009 | Yoshikawa |
| 7,519,918 B2 | 4/2009 | Trantow |
| 7,532,196 B2 | 5/2009 | Hinckley |
| 7,534,988 B2 | 5/2009 | Kong et al. |
| 7,557,965 B2 | 7/2009 | Taylor et al. |
| 7,561,146 B1 | 7/2009 | Hotelling |
| 7,630,716 B2 | 12/2009 | Tamura et al. |
| 7,687,774 B2 | 3/2010 | Ohta et al. |
| 7,688,283 B2 | 3/2010 | Jung et al. |
| 7,715,723 B2 | 5/2010 | Kagawa et al. |
| 7,721,310 B2 | 5/2010 | Schaffer et al. |
| 7,728,958 B2 | 6/2010 | Pfaff |
| 7,795,584 B2 | 9/2010 | Mok et al. |
| 7,814,791 B2 | 10/2010 | Andersson et al. |
| 7,855,716 B2 | 12/2010 | McCreary et al. |
| 7,912,376 B2 | 3/2011 | Rollins |
| 7,967,451 B2 | 6/2011 | Chen et al. |
| 7,971,156 B2 | 6/2011 | Albertson et al. |
| 7,991,575 B2 | 8/2011 | Vogel et al. |
| 7,991,896 B2 | 8/2011 | Shen et al. |
| 8,006,002 B2 | 8/2011 | Kalayjian et al. |
| 8,013,904 B2 | 9/2011 | Tan et al. |
| 8,018,501 B2 | 9/2011 | Sasaki |
| 8,023,061 B2 | 9/2011 | Ra |
| 8,072,469 B2 | 12/2011 | Ottney |
| 8,104,113 B2 | 1/2012 | Rodenbeck et al. |
| 2001/0019338 A1 | 9/2001 | Roth |
| 2002/0104081 A1 | 8/2002 | Candelore et al. |
| 2002/0122072 A1 | 9/2002 | Selker |
| 2002/0199186 A1 | 12/2002 | Ali et al. |
| 2003/0063128 A1 | 4/2003 | Salmimaa et al. |
| 2003/0222917 A1 | 12/2003 | Trantow |
| 2004/0207997 A1 | 10/2004 | Stewart et al. |
| 2005/0104860 A1 | 5/2005 | McCreary et al. |
| 2005/0150697 A1 | 7/2005 | Altman et al. |
| 2005/0198029 A1* | 9/2005 | Pohja et al. ............ 707/8 |
| 2005/0232447 A1 | 10/2005 | Shinozuka et al. |
| 2005/0289182 A1 | 12/2005 | Pandian et al. |
| 2006/0010400 A1 | 1/2006 | Dehlin et al. |
| 2006/0028453 A1 | 2/2006 | Kawabe |
| 2006/0031786 A1 | 2/2006 | Hillis et al. |
| 2006/0059152 A1 | 3/2006 | Nakamura |
| 2006/0067573 A1 | 3/2006 | Parr et al. |
| 2006/0125799 A1 | 6/2006 | Hillis et al. |
| 2006/0132456 A1 | 6/2006 | Anson |
| 2006/0161870 A1 | 7/2006 | Hotelling et al. |
| 2006/0161871 A1 | 7/2006 | Hotelling et al. |
| 2006/0256074 A1 | 11/2006 | Krum et al. |
| 2007/0058255 A1 | 3/2007 | Imai et al. |
| 2007/0109266 A1 | 5/2007 | Davis et al. |
| 2007/0137462 A1 | 6/2007 | Barros et al. |
| 2007/0177803 A1 | 8/2007 | Elias et al. |
| 2007/0180392 A1 | 8/2007 | Russo |
| 2007/0220437 A1 | 9/2007 | Boillot |
| 2007/0247643 A1 | 10/2007 | Nakamura et al. |
| 2008/0005703 A1 | 1/2008 | Radivojevic et al. |
| 2008/0006762 A1 | 1/2008 | Fadell et al. |
| 2008/0024454 A1 | 1/2008 | Everest |
| 2008/0052643 A1 | 2/2008 | Ike et al. |
| 2008/0079902 A1 | 4/2008 | Mandelstam-Manor et al. |
| 2008/0100928 A1 | 5/2008 | Wilson |
| 2008/0122803 A1 | 5/2008 | Izadi et al. |
| 2008/0129688 A1 | 6/2008 | Richardson et al. |
| 2008/0161870 A1 | 7/2008 | Gunderson |
| 2008/0165140 A1 | 7/2008 | Christie et al. |
| 2008/0192005 A1 | 8/2008 | Elgoyhen et al. |
| 2008/0195735 A1 | 8/2008 | Hodges et al. |
| 2008/0204427 A1 | 8/2008 | Heesemans et al. |
| 2008/0211771 A1 | 9/2008 | Richardson |
| 2008/0219672 A1 | 9/2008 | Tam et al. |
| 2008/0225041 A1 | 9/2008 | El Dokor et al. |
| 2008/0240568 A1 | 10/2008 | Tonouchi |
| 2008/0252595 A1 | 10/2008 | Boillot |
| 2008/0256494 A1 | 10/2008 | Greenfield |
| 2008/0266083 A1 | 10/2008 | Midholt et al. |
| 2008/0280642 A1 | 11/2008 | Coxhill et al. |
| 2008/0297487 A1 | 12/2008 | Hotelling et al. |
| 2008/0303681 A1 | 12/2008 | Herz et al. |
| 2008/0309641 A1 | 12/2008 | Harel et al. |
| 2009/0021488 A1 | 1/2009 | Kali et al. |
| 2009/0031258 A1 | 1/2009 | Arrasvuori et al. |
| 2009/0061823 A1 | 3/2009 | Chu |
| 2009/0092284 A1 | 4/2009 | Breed et al. |
| 2009/0158203 A1* | 6/2009 | Kerr et al. ............ 715/784 |
| 2009/0277697 A1 | 11/2009 | Bolt et al. |
| 2009/0299633 A1 | 12/2009 | Hawes et al. |
| 2009/0303176 A1 | 12/2009 | Chen et al. |
| 2010/0164479 A1* | 7/2010 | Alameh et al. ............ 324/115 |
| 2011/0009194 A1 | 1/2011 | Gabai et al. |

FOREIGN PATENT DOCUMENTS

| | | |
|---|---|---|
| EP | 1657819 A2 | 5/2006 |
| EP | 1760573 A2 | 3/2007 |
| EP | 2000896 A2 | 12/2008 |
| EP | 2037349 A2 | 3/2009 |
| JP | 02280427 A | 11/1990 |
| JP | 2005293419 A | 10/2005 |
| JP | 2006010489 A | 1/2006 |
| JP | 2007042020 A | 2/2007 |
| JP | 2009085799 A | 4/2009 |
| KR | 1020030044749 A | 6/2003 |
| KR | 1020050100642 A | 10/2005 |
| WO | 9528777 A1 | 10/1995 |
| WO | 0241129 A2 | 5/2002 |
| WO | 03023701 A2 | 3/2003 |
| WO | 03076870 A1 | 9/2003 |
| WO | 2005076542 A1 | 8/2005 |
| WO | 2005101176 A2 | 10/2005 |
| WO | 2008016394 A2 | 2/2008 |
| WO | 2008073289 A3 | 6/2008 |

OTHER PUBLICATIONS

United States Patent and Trademark Office, "Non-Final Office Action" for U.S. Appl. No. 12/428,260, Oct. 5, 2011, 10 pages.

United States Patent and Trademark Office, "Non-Final Office Action Summary" for U.S. Appl. No. 12/428,187, Oct. 26, 2011, 27 pages.

U.S. Patent and Trademark Office, "Notice of Allowance" for U.S. Appl. No. 12/344,760, Jan. 3, 2011, 9 pages.

Patent Cooperation Treaty, "PCT Search Report and Written Opinion of the International Searching Authority" for International Application No. PCT/US2010/030964, Nov. 9, 2010, 24 pages.

Patent Cooperation Treaty, "PCT Search Report and Written Opinion of the International Searching Authority" for International Application No. PCT/US2010/033472, Dec. 15, 2010, 9 pages.

United States Patent and Trademark Office, "Non-Final Rejection" for U.S. Appl. No. 12/500,625, Dec. 29, 2011, 30 pages.

G.Yun and M.Kavehrad, "Spot diffusing and fly-eye receivers for indoor infrared wireless communications", Proc. 1992 IEEE, Conf. Sel, Topics in Wireless Comm., Vancouver, BC, Canada, Jun. 25-26, 1992, pp. 286-292.

Kahn, J.M.; You, R., Djahani, P., Weisbin, A.G."Imaging Diversity Receivers for high-speed infrared wireless communication", IEEE Communications Mag., Dec. 1998, Accessed May 7, 2009; 7 pages.

Ward, A.; Jones A.; Hopper A.; "A new location technique for the active office"; IEEE Personal Communications, 1997; accessed May 7, 2009; 11 pages.

Metzger, C.; Anderson, M.; Starner, T.; "FreeDigiter: A contact-free device for gesture control"; Wearable Computers, 2004; ISWC 2004, 8th International Symposium, vol. 1, 10-31/10-4, 2004, pp. 18-21.

Von Hardenberg, C.; Berard F.; "Bare-hand human-computer interaction" PUI; ACM 1-58113-448-7 Nov. 14, 2001; Orlando, FL, USA; 8 pages.

TrackIR: Vector Expansion: True 6DOF view control offer 3-dimensional virtual reality via motion control; TrackIR by NaturalPoint; www.naturalpoint.com; 2 pages Aug. 2005.

Bricklin, D.; Gestures, the iPhone, and Standards: A Developer's Questions, www.bricklin.com, 10 pages, 1999-2009.

Gearlog, Microsoft's sidesight: something Apple show watch, www.gearlog.com; 5 pages, 1996-2008, Ziff Davis Publ. Holdings, Inc.

Hadamard transform—Wikipedia definition; http://en.wikipedia.org/wiki/Hadamard_transform; 4 pages, Oct. 2009.

Silicon Laboratories, Inc.; Si1120 Evaluation Kit User's Guide, Austin, TX, Dec. 2009, 10 pages; www.silabs.com/support/pages/contacttechnicalsupport.aspx.

U.S. Appl. No. 12/643,211, filed Dec. 21, 2009; "Electronic device with sensing assembly and method for interpreting consecutive gestures."

U.S. Appl. No. 12/640,867, filed Dec. 17, 2009, "Electronic device with sensing assembly and method for detecting basic gestures."

U.S. Appl. No. 12/646,601, filed Dec. 23, 2009, "Electronic device with sensing assembly and method for detecting gestures of geometric shapes."

U.S. Appl. No. 12/648,503, filed Dec. 29, 2009, "Electronic device with sensing assembly and method for interpreting offset gestures."

U.S. Appl. No. 12/471,062, filed May 22, 2009, "Sensing assembly for mobile device."

U.S. Appl. No. 12/645,244, filed Dec. 22, 2009, "Method and system for conducting communication between mobile devices."

U.S. Appl. No. 12/646,199, filed Dec. 23, 2009, "Method and system for controlling data transmission to or from a mobile device."

U.S. Appl. No. 12/344,760, filed Dec. 29, 2008, "Portable electronic device having self-calibrating proximity sensors."

U.S. Appl. No. 12/347,146, filed Dec. 31, 2008, "Portable electronic device having directional proximity sensors based on device orientation."

United States Patent and Trademark Office, "Final Rejection" for U.S. Appl. No. 12/428,187, Apr. 10, 2012, 10 pages.

United States Patent and Trademark Office, "Final Rejection" for U.S. Appl. No. 12/428,266, Mar. 14, 2012, 9 pages.

United States Patent and Trademark Office, "Non-Final Rejection" for U.S. Appl. No. 12/646,199, Mar. 7, 2012, 17 pages.

United States Patent and Trademark Office, "Non-Final Rejection" for U.S. Appl. No. 12/471,062, Oct. 4, 2011, 15 pages.

United States Patent and Trademark Office, "Final Rejection" for U.S. Appl. No. 12/471,062, Feb. 22, 2012, 15 pages.

United States Patent and Trademark Office, "Non-Final Rejection" for U.S. Appl. No. 12/646,601, Feb. 14, 2012, 9 pages.

United States Patent and Trademark Office, "Non-Final Rejection" for U.S. Appl. No. 12/640,867, Sep. 30, 2011, 11 pages.

United States Patent and Trademark Office, "Final Rejection" for U.S. Appl. No. 12/640,867, Mar. 30, 2012, 11 pages.

United States Patent and Trademark Office, "Non-Final Rejection" for U.S. Appl. No. 12/648,503, Feb. 17, 2012, 7 pages.

Thad Starner et al., "The Gesture Pendant: A Self-illuminating, Wearable, Infrared Computer Vision System for Home Automation Control and Medical Monitoring", 4th IEEE Int'l Symp. on Wearable Computers, 2000, pp. 87-94.

Heinrich Ruser, "Object recognition with a smart low-cost active infrared sensor array", 1st Int'l Conf. on Sensing Tech., Nov. 21-23, 2005, pp. 494-499.

Jungsoo Kim et al., "The Gesture Watch: A Wireless Contact-free Gesture based Wrist Interface", 11th IEEE Int'l Symp. on Wearable Computers, 2007, pp. 15-22.

Patent Cooperation Treaty, "PCT Search Report and Written Opinion of the International Searching Authority" for International Application No. PCT/US2010/061254, Apr. 7, 2011, 16 pages.

Patent Cooperation Treaty, "PCT Search Report and Written Opinion of the International Searching Authority" for International Application No. PCT/US2010/061261, Mar. 17, 2011, 14 pages.

United States Patent and Trademark Office, "Non-Final Rejection" for U.S. Appl. No. 12/471,062, Apr. 25, 2011, 16 pages.

Vladislav Pavlov et al., "Model-based object characterization with active infrared sensor array," IEEE Sensors Conference, 2007, pp. 360-363.

Henrik V. Christensen, "Retrieval of 3D-position of a Passive Object using Infrared LED's and Photodiodes," International Conference on Acoustics, Speech, and Signal Processing (ICASSP), 2005, pp. IV1093-IV1096.

Specification of the Bluetooth System; Master Table of Contents & Compliance Requirements; Covered Core Package V. 3.0 +HS; Apr. 21, 2009; 192 pages.

United States Patent and Trademark Office, "Non-Final Rejection" for U.S. Appl. No. 12/645,244, May 24, 2012, 8 pages.

Patent Cooperation Treaty, "Notification of Transmittal of the International Search Report and the Written Opinion of the International Searching Authority, or the Declaration" for PCT/US2010/039561, Sep. 30, 2010, pp. 1-13.

Patent Cooperation Treaty, "Notification of Transmittal of the International Search Report and the Written Opinion of the International Searching Authority, or the Declaration" for PCT/US2010/028654, Dec. 1, 2010, pp. 1-22.

Patent Cooperation Treaty, "PCT Search Report and Written Opinion of the International Searching Authority" for International Application No. PCT/US2009/066555, Jul. 16, 2010, 11 pages.

Ziff Davis Publishing Holdings Inc., "Microsoft's SideSight: Something Apple Should Watch", www.gearlog.com/2008/10/microsofts_sidesight_something.php, Oct. 20, 2008, 4 pages.

Christian Metzger et al., "FreeDigiter: A Contact-Free Device for Gesture Control", Eighth International Symposium on Wearable Computers (ISWC 2004), Oct. 31-Nov. 3, 2004, 4 pages.

Silicon Laboratories, Inc., Si1120 Evaluation Kit User's Guide (Si1120-EK), Dec. 2009, 10 pages.

Andy Ward et al., "A New Location Technique for the Active Office", IEEE Personal Communications, Oct. 1997, 11 pages, vol. 4 Issue 5.

Dan Bricklin, "Gestures, the iPhone, and Standards: A Developer's Questions", www.bricklin.com/gestures.htm, Oct. 24, 2007, 10 pages.

Wikipedia, "Hadamard Transform" entry, http://en.wikipedia.org/wiki/Hadamard_transform; accessed Jan. 12, 2010, 4 pages.

Christian Von Hardenberg and Francois Berard, "Bare-Hand Human-Computer Interaction", Proceedings of the ACM Workshop on Perceptive User Interfaces, Nov. 15-16, 2001, 8 pages.

Naturalpoint, Inc., "How TrackIR Works", www.naturalpoint.com/trackir/02-products/product-how-TrackIR-works.html; accessed Jan. 13, 2010, 2 pages.

U.S. Appl. No. 12/428,187, filed Apr. 22, 2009 "Menu Configuration System and Method for Display on an Electronic Device".

U.S. Appl. No. 12/428,266, filed Apr. 22, 2009 "Touch-Screen and Method for an Electronic Device".

U.S. Appl. No. 12/500,625, filed Jul. 10, 2009 "Devices and Methods for Adjusting Proximity Detectors".

U.S. Appl. No. 12/643,211, filed Dec. 21, 2009 "Electronic device with sensing assembly and method for interpreting consecutive gestures".

U.S. Appl. No. 12/640,867, filed Dec. 17, 2009 "Electronic device with sensing assembly and method for detecting basic gestures".

United States Patent and Trademark Office, "Final Rejection" for U.S. Appl. No. 12/646,199, Sep. 17, 2012, 21 pages.

Michael McKenna, "Interactive Viewpoint Control and Three-Dimensional Operations", Proceedings of the 1992 Symposium on Interactive 3D Graphics, 1992, pp. 53-56.

United States Patent and Trademark Office, "Non-Final Rejection" for U.S. Appl. No. 12/643,211, Sep. 17, 2012, 8 pages.

\* cited by examiner

MOBILE DEVICE WITH USER INTERACTION CAPABILITY AND METHOD OF OPERATING SAME

CROSS-REFERENCE TO RELATED APPLICATIONS

This application is a continuation-in-part and claims the benefit of U.S. patent application Ser. No. 12/471,062, titled "Sensing Assembly For Mobile Device" and filed on May 22, 2009, which is hereby incorporated by reference herein.

FIELD OF THE INVENTION

The present invention relates generally to mobile devices and, more particularly, to methods and systems capable of being implemented by mobile devices that facilitate interactions with one or more of those mobile devices.

BACKGROUND OF THE INVENTION

Mobile devices such as cellular telephones, smart phones, and other handheld or portable electronic devices such as personal digital assistants (PDAs), headsets, MP3 players, etc. have become increasingly popular and ubiquitous. As more and more people carry mobile devices with them, there is a desire that such mobile devices become capable of numerous functions, yet also be easy to use.

Conventional mobile devices have numerous touch-sensitive input actuation mechanisms, such as buttons, keypads, joysticks, touchscreens, etc. These input actuation mechanisms are often sometimes unwieldy depending upon the circumstance. This can be particularly true for some users, for example, those with larger hands or the elderly. In addition, the necessity of repeatedly entering various commands can be time consuming and non-intuitive.

Therefore, for the above reasons, there is an opportunity to develop a method and/or system that provides convenient user interaction functionality.

DETAILED DESCRIPTION

Figure 1:
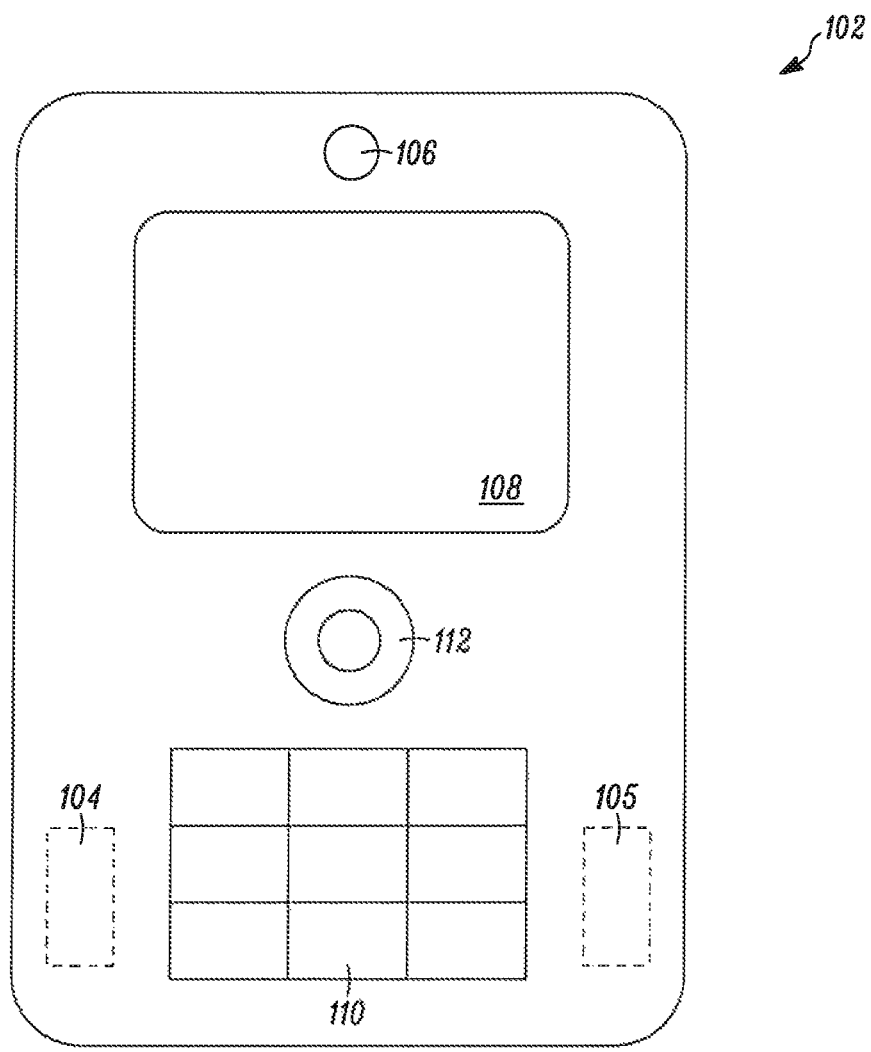
FIG. 1 is a front view of one embodiment of an exemplary mobile device described herein.

Methods, mobile devices, and systems with support for interactions with one or more mobile devices with acceleration and proximity sensing, are described below. In at least one embodiment, a mobile device including an accelerometer and infrared sensor is configured to associate commands (or, in some cases, to learn commands) through accelerometer sensing and then to actuate the commands based on infrared sensing, or vice-versa. The commands can include a plethora of possibilities. For example, commands for turning a page on an electronic book (e.g., eBook), changing TV channels, scrolling through a list or website (or web pages thereof), transferring a song to another mobile device, etc., can be implemented with a slight movement of the mobile device and the waving of a hand over the mobile device. In additional embodiments, such acceleration and infrared sensing is utilized to govern an interaction between a first mobile device and another mobile device based upon the first mobile device's orientation with respect to the other mobile device, such as when both devices are orientated flat on a horizontal surface. Upon determining appropriate interfacing between the mobile devices based upon the orientation of the mobile devices, a slight movement of the mobile device, and the waving of a hand over the mobile device can transfer data from one device to another.

More particularly, one embodiment relates to a method of operating a mobile device The method includes sensing at least one of an orientation and a movement of the mobile device, selecting a command based on the sensed orientation or sensed movement, and executing the command upon sensing a proximity of an object in relation to at least a portion of the mobile device. An additional embodiment relates to a method of operating a first mobile device in relation to a second mobile device. The method includes sensing a first orientation of the first mobile device relative to a reference orientation and receiving, from the second mobile device, information concerning a second orientation of the second mobile device relative to the reference orientation. The method additionally includes determining whether a first criterion concerning a similarity between the first orientation and the second orientation has been met, and transferring first data from the first mobile device to the second mobile device upon sensing a triggering event, provided that the first criterion has been met.

An additional embodiment involves a mobile device. The mobile device includes a processor, a wireless transceiver coupled to the processor, and an accelerometer coupled to the processor to provide a first signal to the processor indicative of a first orientation, first movement, or first acceleration of the mobile device. The mobile device further includes an infrared proximity sensor, coupled to the processor, for providing a second signal indicative of a presence of an object in proximity to the infrared proximity sensor. The processor determines based at least in part upon the first signal whether a first criterion has been met and, upon determining that the first criterion has been met, enters a first state in which the processor is prepared to execute a command upon receiving the second signal. Further, the processor, upon receiving the second signal, executes the command.

FIG. 1 shows an exemplary mobile device 102 that includes, among its various components, an accelerometer 104 (shown in phantom), such as a gravimeter, an electronic compass 105 (shown in phantom), and an infrared proximity sensor 106, in accordance with a first embodiment. In the present example, the mobile device 102 is a personal digital assistant (PDA), albeit the mobile device is also intended to be representative of a variety of other mobile devices as well, including for example, cellular telephones, smart phones, other handheld or portable electronic devices such as notebook, netbook, or laptop computing devices, remote controllers, headsets, MP3 players and other portable video and audio players, global positioning navigation devices, and even other electronic devices, including a wide variety of devices that can utilize or benefit from control based upon the sensed presence of one or more external objects (e.g., electronic displays, kiosks, ATMs, vending machines, vehicles, etc.). Further included among the components of the mobile device 102 as shown in FIG. 1 are a video screen 108, a keypad 110 having numerous keys, and a navigation key cluster (in this case, a "five-way navigation key cluster") 112. Although an electronic compass 105 is included separately with the exemplary embodiment to assist with orientation sensing, in at least some embodiments, the acceleration sensor 104 provides orientation sensing without the addition of the electronic compass 105.

Figure 2:
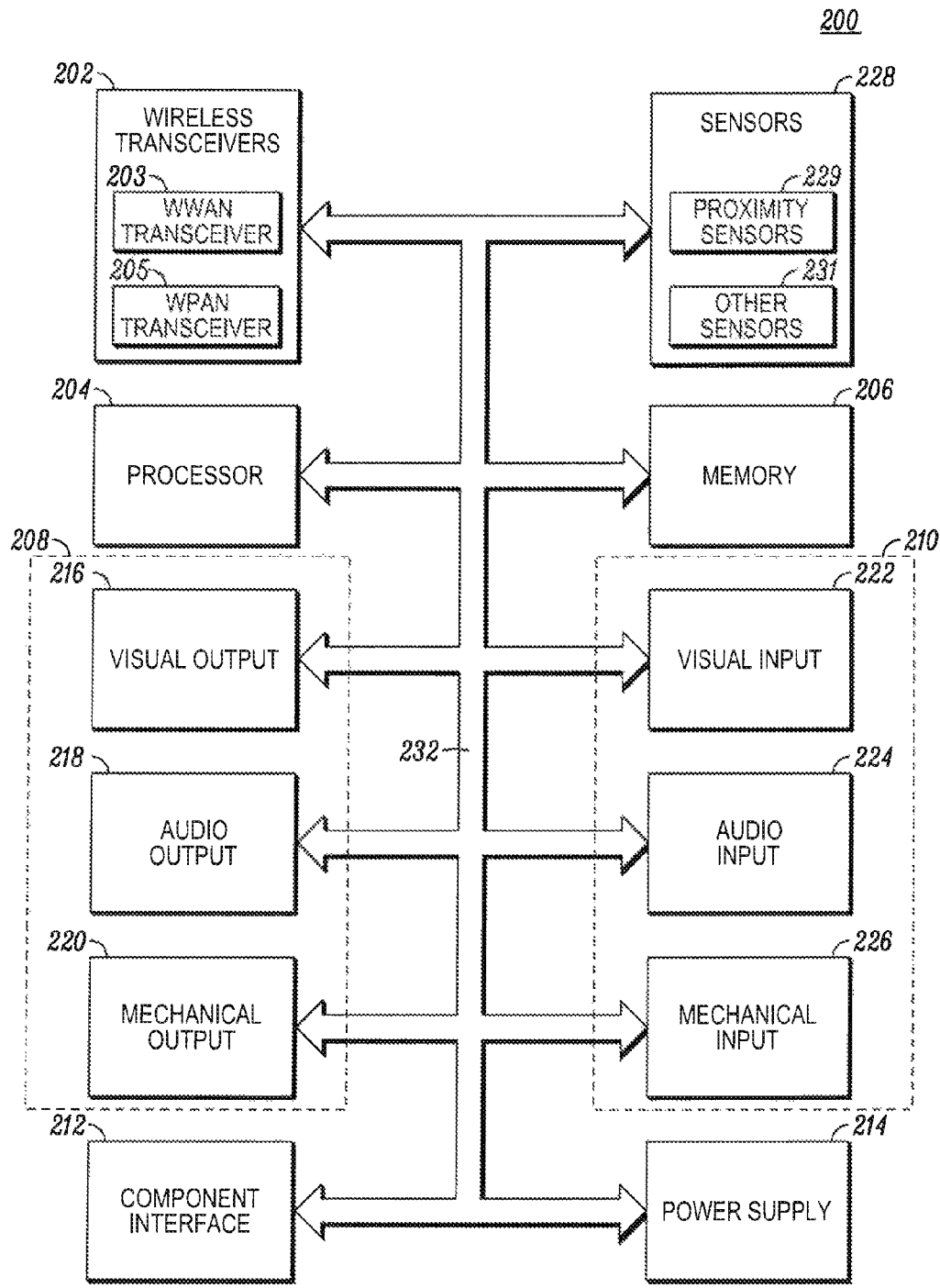
FIG. 2 is a block diagram illustrating exemplary components of the mobile device of FIG. 1.

FIG. 2 illustrates example internal components 200 of a mobile device, such as the mobile device 102. This embodiment includes one or more wireless transceivers 202, a processor 204 (e.g., a microprocessor, microcomputer, application-specific integrated circuit, etc.), a memory portion 206, one or more output devices 208, and one or more input devices 210. In at least some embodiments, a user interface component (e.g.; a touch screen) is considered both an output device 208 and an input device 210. The internal components 200 can further include a component interface 212 to provide a direct connection to auxiliary components or accessories for additional or enhanced functionality. The internal components 200 preferably also include a power supply 214, such as a battery, for providing power to the other internal components while enabling the mobile device 102 to be portable. As will be described in further detail, the internal components 200 in the present embodiment further include sensors 228 such as the infrared proximity sensor 106, the accelerometer 104, and the electronic compass 105 of FIG. 1. All of the internal components 200 can be coupled to one another, and in communication with one another, by way of one or more internal communication links 232 (e.g., an internal bus).

Each of the wireless transceivers 202 utilize a wireless technology for communication, such as, but not limited to, wireless wide area network (WWAN) technologies such as analog communications (using AMPS), digital communications (using CDMA, TDMA, GSM, iDEN, GPRS, EDGE, etc.), and next-generation communications (using UMTS, WCDMA, LTE, IEEE 802.16, etc.) or variants thereof, or peer-to-peer or ad hoc communication technologies such as HomeRF, Bluetooth® and IEEE 802.11(a, b, g or n), or other wireless communication technologies such as infrared technology. In the present embodiment, the wireless transceivers 202 include both a WWAN transceiver 203 and a wireless personal area network (WPAN) transceiver 205 (which particularly can employ Bluetooth® technology), although in other embodiments only one of these types of wireless transceivers (and possibly neither of these types of wireless transceivers, and/or other types of wireless transceivers) is present. Also, the number of wireless transceivers can vary and, in some embodiments, only one wireless transceiver is present and further, depending upon the embodiment, each wireless transceiver 202 can include both a receiver and a transmitter, or only one or the other of those devices.

Exemplary operation of the wireless transceivers 202 in conjunction with others of the internal components 200 of the mobile device 102 can take a variety of forms and can include, for example, operation in which, upon reception of wireless signals, the internal components detect communication signals and the transceiver 202 demodulates the communication signals to recover incoming information, such as voice and/or data, transmitted by the wireless signals. After receiving the incoming information from the transceiver 202, the processor 204 formats the incoming information for the one or more output devices 208. Likewise, for transmission of wireless signals, the processor 204 formats outgoing information, which may or may not be activated by the input devices 210, and conveys the outgoing information to one or more of the wireless transceivers 202 for modulation to communication signals. Depending upon the embodiment, the wireless transceiver(s) 202 can convey the modulated signals to, or receive modulated signals from, a remote device, such as a cell tower, an access point, or a remote server (not shown), and/or from another mobile device that is located remotely (including, for example, in the case where two mobile devices are in communication via a Bluetooth® link).

Depending upon the embodiment, the output devices 208 of the internal components 200 can include a variety of visual, audio, and/or mechanical output devices. For example, the output device(s) 208 can include a visual output device 216 such as a liquid crystal display and light emitting diode indicator, an audio output device 218 such as a speaker, alarm and/or buzzer, and/or a mechanical output device 220 such as a vibrating mechanism. The visual output devices 216 among other things can include the video screen 108 of FIG. 1.

Likewise, the input devices 210 can take a variety of forms. For example, the input devices 210 can include a visual input device 222 such as an optical sensor (for example, a camera), an audio input device 224 such as a microphone, and a mechanical input device 226 such as a flip sensor, keyboard, keypad, selection button, touch pad, touchscreen, capacitive sensor, or motion sensor. The mechanical input device 226 can also in particular include, among other things, the keypad 110 and the navigation key cluster 112 of FIG. 1. Actions that can actuate one or more of the input devices 210 can further include, but need not be limited to, opening the mobile device, unlocking the device, moving the device to actuate a motion, moving the device to actuate a location positioning system, and otherwise operating the device.

In at least some circumstances, the sensors 228 are considered as input devices 210. In particular as shown, the sensors 228 can include both proximity sensors 229 and other sensors 231. As will be described in further detail, the proximity sensors 229 can include, among other things, one or more sensors such as the infrared proximity sensor 106 of FIG. 1 by which the mobile device 102 is able to detect the presence (or passing) of an external object, including portions of the body of a human being such as a hand (not shown). By comparison, the other sensors 231 can include a variety of other types of sensors such as, for example, a variety of circuits and sensors capable of allowing orientation/location determinations (and/or related determinations, such as determinations concerning velocity or acceleration) to be made including, for example, the accelerometer 104 and electronic compass 105 of FIG. 1. In addition, other devices/components, such as a gyroscope or other information collecting device(s) that can identify a current location or orientation of the mobile device 102, can be present depending upon the embodiment.

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. The data that is stored by the memory portion 206 can include, but need not be limited to, operating systems, applications, and informational data. Each operating system includes executable code that controls basic functions of the communication device, such as interaction among the various components included among the internal components 200, communication with external devices via the wireless transceivers 202 and/or the component interface 212, and storage and retrieval of applications and data to and from the memory portion 206. Each application includes executable code that utilizes an operating system to provide more specific functionality for the communication devices, such as file system service and handling of protected and unprotected data stored in the memory portion 206. Informational data is non-executable code or information that can be referenced and/or manipulated by an operating system or application for performing functions of the communication device.

Figure 3:
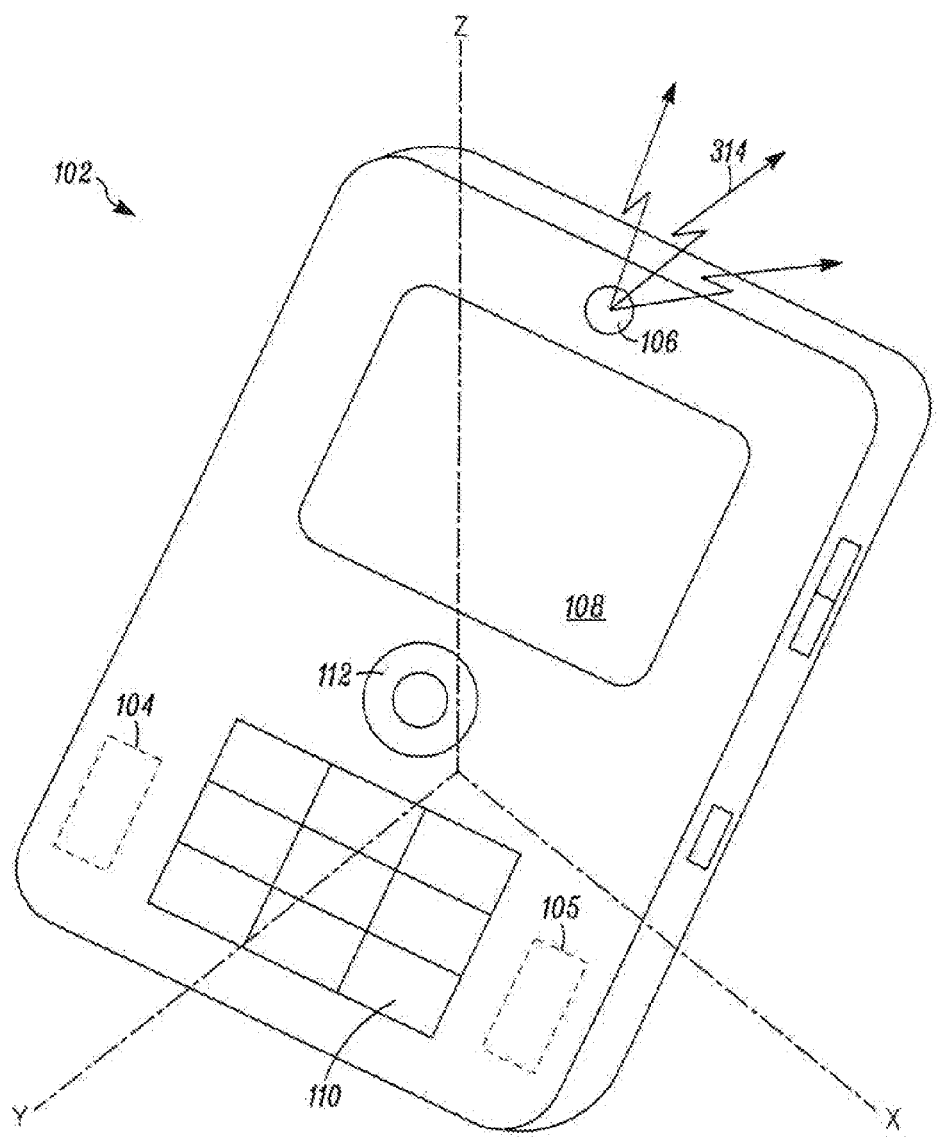
FIG. 3 is a further perspective view of the mobile device of FIG. 1 shown in relation to an exemplary coordinate system.
Figure 4:
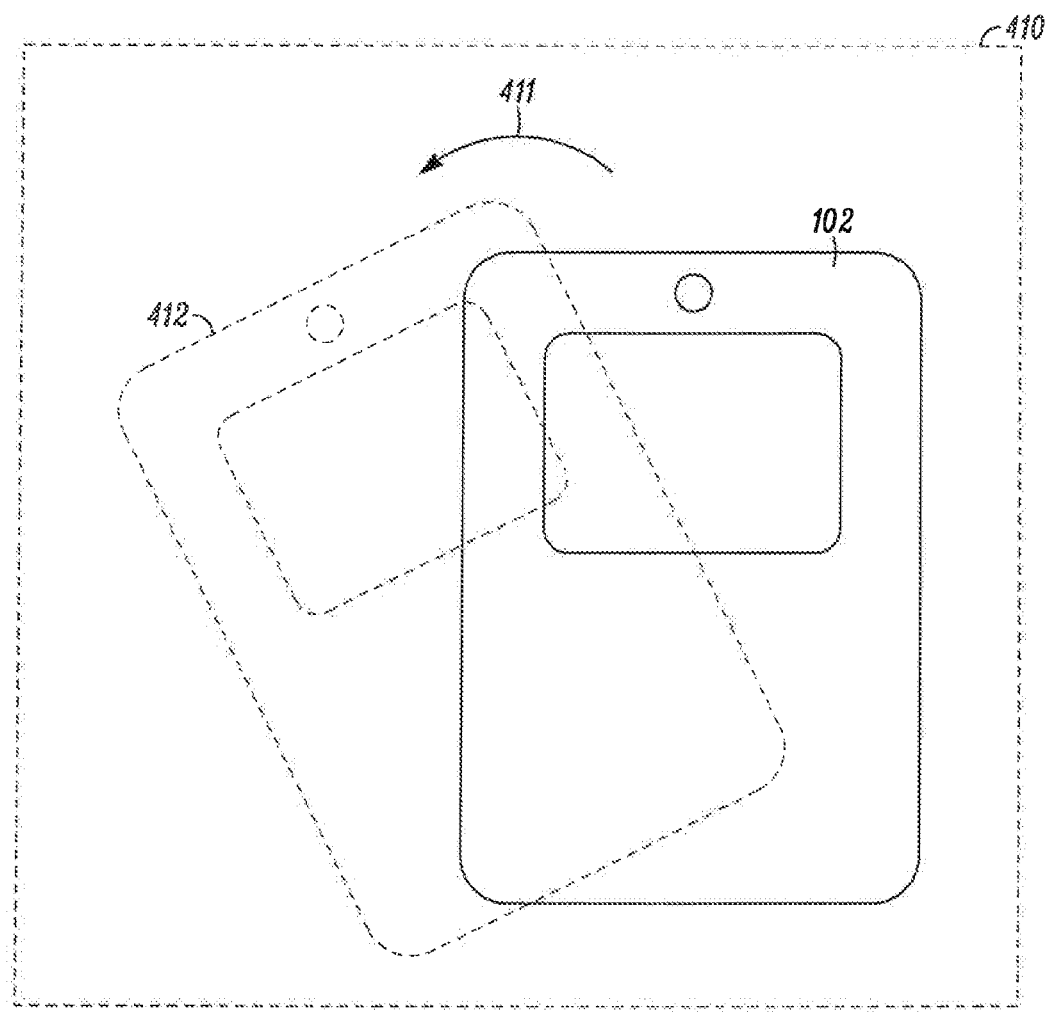
FIG. 4 is a top view of the mobile device of FIG. 1 being moved in a manner parallel to an X-Y plane defined by the coordinate system of FIG. 3.
Figure 5:
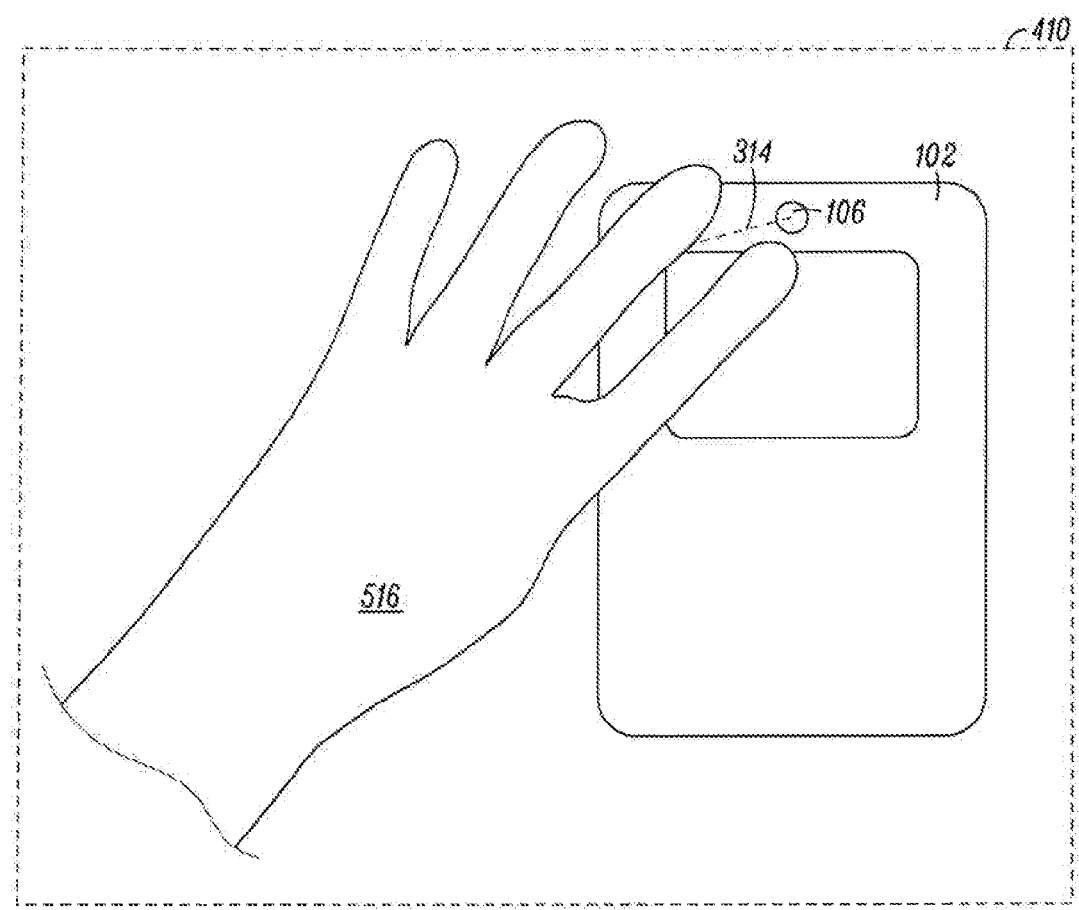
FIG. 5 is a top view of the mobile device in FIG. 4 with a hand being waved over an infrared proximity sensor of the mobile device.

FIGS. 3-5 depict the mobile device 102 of FIG. 1 in several different contexts. More particularly, FIG. 3 provides a perspective view of the mobile device 102 showing the mobile device in relation to an exemplary coordinate system that in this case is a conventional 3-D coordinate system having X, Y and Z axes that are each perpendicular with respect to one another. In the present embodiment, the accelerometer 104 can be used to measure static acceleration, such as the tilt of the mobile device relative to gravity, as well as dynamic acceleration, such as that resulting from motion, shock, or vibration of the mobile device. This information can be used to provide acceleration, motion, and orientation information for the mobile device. In addition, in conjunction with other information (e.g., information regarding an initial orientation and/or velocity of the mobile device), it can be used to further determine a change in the orientation and/or velocity of the mobile device 102. As one example in this regard, FIG. 4 depicts the mobile device 102 with an exemplary partly-translational, partly-rotational movement. The movement, shown in FIG. 4 particularly, is representative of a common type of movement that can be experienced by the mobile device 102, in which the mobile device 102 is oriented substantially flat on a surface, such as a tabletop 410, countertop, motor vehicle console, etc., and subsequently angled to one side by a user so as to arrive at a second orientation, as represented by a second image of the mobile device 412 (shown in phantom). Upon moving the mobile device to the second orientation, the mobile device 102 can be left there or returned to its original resting orientation. The mobile device 102 can also be held in hand instead of being orientated flat on a surface as it undergoes a similar motion as described above with reference to FIG. 4.

In addition to sensing motion, the mobile device 102 infrared proximity sensor 106 is capable of sensing an object that is present in proximity to it. As shown in FIG. 5, in one embodiment the infrared proximity sensor 106 operates by transmitting an infrared signal 314 generated by at least one infrared phototransmitter (e.g., a photo-light emitting diode (photo-LED)). An object that is present such as a hand 516, then reflects portions of the infrared signal 314 to constitute at least one reflected signal (e.g., a reflected signal also proceeding along the same general path as the infrared signal 314). The reflected signal is in turn sensed by at least one photoreceiver (e.g., photodiode), which is also part of the infrared proximity sensor. In some embodiments, it is sufficient for infrared proximity sensing that the infrared proximity sensor 106 have only a single infrared phototransmitter and a single infrared photoreceiver. However, in alternate embodiments a variety of other types of infrared proximity sensor arrangements can be employed including, for example, the use of multiple proximity sensors (each with potentially its own phototransmitter and photoreceiver) positioned at multiple locations on the mobile device, as well as the use of any of a variety of different types of pyramid-type sensing assemblies such as those described in pending U.S. patent application Ser. No. 12/471,062 entitled "Sensing Assembly for Mobile Device" and filed on May 22, 2009, which is hereby incorporated by reference herein. Other types of proximity sensors can also be used such as, but not limited to, ultrasonic, capacitive, inductive, resistive, RF, and camera type image sensors.

As discussed in further detail below, in at least some embodiments it is possible for the mobile device 102 to interface with a user or other mobile device(s) based upon the combination of sensed motion information obtained using the accelerometer 104, and sensed presence/proximity information obtained using the infrared proximity sensor 106. More particularly, in such embodiments, the mobile device 102 can interpret one or more particular sensed motions as being respectively indicative of selecting one or more particular commands. The sensing of the motions does not cause the mobile device 102 to execute the commands corresponding to those motions, but rather cause the mobile device to enter into a state of readiness in which the mobile device is then receptive to trigger signals sensed by way of the infrared proximity sensor 106 or other types of proximity sensors. Thus, when a trigger signal is received, the mobile device executes those commands. The trigger signal can include one or more of numerous signals received from various components, for example, signals from the infrared proximity sensor, a push-button, and motion sensing devices. In the present embodiment, upon sensing movement of the mobile device 102 in the manner shown in FIG. 4, the mobile device then becomes ready to execute a command or operation corresponding to that particular movement. The mobile device does not execute that command or operation until it senses the presence of the hand 516 in proximity to (or movement of the hand across) the infrared proximity sensor 106 as represented by FIG. 5. The mode and context of the mobile device 102 can in part aid with the interpreting the command, for example, holding the mobile device at an angle and displaying pictures, or holding or laying the mobile device in a stationary horizontal position during a hands-free phone call. Further, the proximity sensor 106 can be utilized to sense a temporarily-present object (e.g., an object passing by) or a relatively stable presence of an object, with the length of presence being indicated by the amount of time the proximity sensor 106 provides a "high" sensing signal. In addition, this sensing can be used to direct the execution of different commands based on the time duration.

Figure 6:
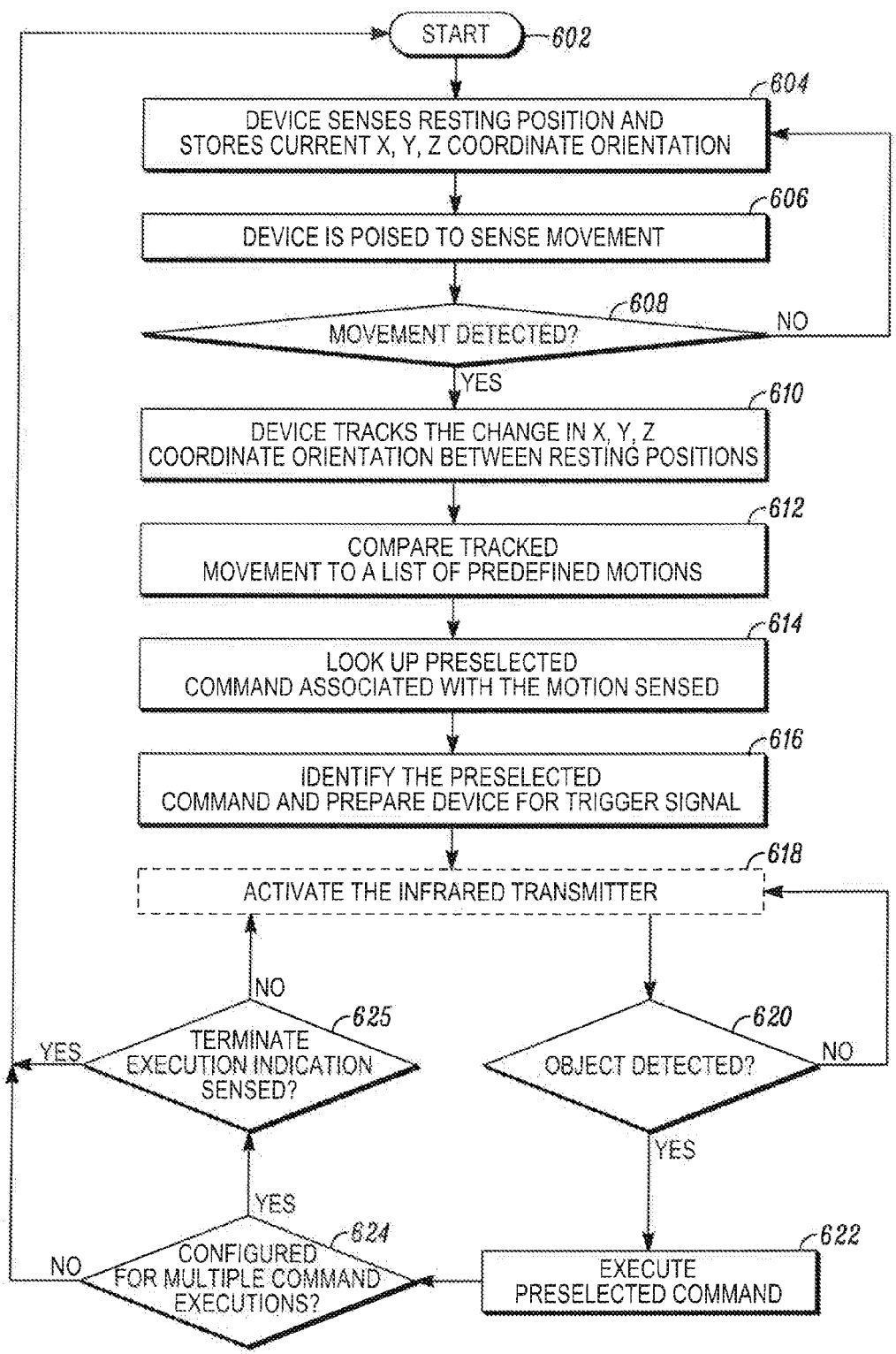
FIG. 6 is a flow chart illustrating exemplary steps of interfacing with the mobile device of FIG. 1 to initiate a command.

FIG. 6 shows one exemplary manner of interfacing with the mobile device 102 to initiate a command. As shown, after starting the operation at step 602, at step 604 the mobile device 102 is placed in a substantially motionless orientation for a preset amount of time, as detected by a lack of significant acceleration in any direction. As this occurs, the processor 204 (see FIG. 2) of the mobile device 102 senses the relative motionlessness (i.e., motion is less than a predetermined threshold). In at least some cases, the processor 204 at this time is also able to determine the current coordinates (e.g., X, Y, and Z coordinates along the coordinate axes X, Y, and Z of FIG. 3) of the device and store them in the memory 206 (see FIG. 2). Such determinations can be made using only the accelerometer 104, assuming that the mobile device 102 is continuously using the accelerometer 104 to detect and record ongoing movement of the mobile device over time relative to an initial starting location (the coordinates of which can be set by a user or preset at a factory), and/or using accelerometer information in conjunction with other information such as that provided by a GPS receiver.

The relative motionlessness of the mobile device 102 as sensed at step 604 in the present embodiment serves as a cue to the mobile device that the mobile device is potentially about to be moved in a manner that signifies that a command selection is forthcoming. Thus, at step 606, the mobile device 102 is waiting to sense motion and at step 608 a determination is made by the mobile device 102 as to whether motion is detected. If motion is not detected at step 608, then the process returns to the step 604. Alternatively, if motion is detected at step 608, the process advances to a step 610, at which the processor 204 uses the accelerometer 104 to track the motion of the mobile device 102 during movement. In some cases, the processor 204 actually determines the specific orientation variation experienced by the mobile device 102, by calculation by using double integration, assuming a known starting orientation, regardless of whether the device is in hand or resting on a surface. In other cases, the processor 204 merely monitors the variation in acceleration experienced by the mobile device 102 and sensed by the accelerometer 104 (also, in some embodiments, velocity can be specifically determined/monitored, as in the case where the mobile device starting orientation is not stationary). Still in other cases, the electronic compass 105 can be used to supplement the acceleration sensor 104 by further monitoring the motion of the mobile device 102. The motion is tracked until the mobile device becomes relatively stationary (i.e., motion sensed is less than a predetermined threshold). To the extent that the mobile device 102 is located within a moving vehicle (e.g., on the dashboard of a car), in some embodiments further adjustments to the above process can be made to take into account the motion of the mobile device due to the movement of the vehicle.

Next, at step 612, the processor 204 compares the tracked movement to a list of numerous predefined/pre-stored motions, such as angling of the mobile device 102 to the left from a resting orientation along the arrow 411 as shown in FIG. 4. Then at step 614, the processor 204 searches the memory 206 for preselected commands associated with the motion that has been sensed. The preselected commands and their associated movements can be provided to the mobile device 102 in various manners, for example, as preset information provided by the mobile device manufacturer, through application software, or as specified by a user who has programmed the mobile device according to the user's own preferences. In some cases, it is desirable that a given movement be associated with a given command that is intuitively associated with such movement. For example, when viewing an eBook on the mobile device, a clock-wise (CW) twitching motion can be used to command the device to show a subsequent page and a counter-clock-wise (CCW) twitching motion can be used to view a preceding page. Assuming that there is in fact a particular command that is associated with the tracked movement, at step 616 the processor 204 marks the particular command identified in step 614 and the mobile device 102 can enter a state of readiness to perform that command, wherein the mobile device 102 awaits a trigger signal before executing the command. More particularly, in at least one embodiment, the state of readiness can include loading an application start command or other executable corresponding to that command into the memory 206 for retrieval or execution during step 622.

In the present embodiment, the infrared proximity sensor 106 serves as a trigger capable of providing a trigger signal to the processor 204. Thus, upon loading in the preselected command at step 616, at step 618 the processor 204 activates the transmitter portion of the infrared proximity sensor 106 to transmit the infrared signal 314 outward from the mobile device. Notwithstanding step 618, in some embodiments the infrared proximity sensor 106 is continuously operational and need not be specifically activated. Next, at step 620, based upon signals from the infrared proximity sensor 106 the processor 204 determines whether an object is present (or passing) in proximity to the infrared proximity sensor. For example, if the infrared proximity sensor 106 senses a reflected infrared signal indicating that an object such as the hand 516 of FIG. 5 has been detected, then the infrared proximity sensor 106 provides a signal back to the processor 204 indicating that an object is proximal, and thus the processor determines the presence of the object.

Lacking the detection of an object at step 620, the process returns to step 618 for a duration of time or until a signal is received to return to step 602. However, upon detection of an object at step 620, the process advances to a step 622, executing the previously-selected command. In some embodiments, a single performance of the command at step 622 ends the process. However, in alternate embodiments it is possible for a user to repeatedly reexecute the preselected command. In such embodiments, upon completion of the step 622, at step 624 the processor 204 determines whether the mobile device 102 is configured for multiple executions of the same command. If the mobile device 102 is not so configured, then the process ends (or, as shown, the process returns to the step 602). However, if the mobile device 102 is so configured, then the process continues to step 625 where the mobile device 102 verifies that a terminate execution directive has not been sensed. If no directive has been sensed, then the process returns to the step 618, to determine whether the infrared proximity sensor 106 again senses an object. Thus, a user can repeatedly issue the same command by providing an object in proximity to the infrared proximity sensor 106 repeatedly (e.g., by waiving the hand 516 back and forth repeatedly across the mobile device). Alternatively, if a terminate execution directive has been sensed (e.g. timer expiration, input signal, etc) at step 625, then the process returns to step 602.

As discussed above, the use of the accelerometer 104 and the infrared proximity sensor 106, particularly in combination, provides functionality to the mobile device 102 that significantly increases the intuitive use of the mobile device 102 for a plethora of applications. In one exemplary embodiment for example, when using an application that allows for viewing an ebook on the mobile device 102, the mobile device can have a preselected command that correlates the command of turning a page forward with a twitching motion of the mobile device to the left thereby allowing the user to provide a single twitch to load the page turn command and then subsequently wave a hand over the mobile device 102 each time the viewer wishes to turn the page forward. In another example, the preselected command corresponding to a right twitch motion can be a pairing command for initiating pairing with another mobile device within range of the mobile device 102 using a communication protocol such as Bluetooth®. The user passing a hand over the mobile device can then subsequently achieve establishment of the pairing.

In addition to the above-described embodiments, also encompassed herein are embodiments in which the interfacing of a mobile device such as the mobile device 102 with another mobile device is influenced or governed based upon infrared proximity information and at least one of sensed acceleration and orientation. More particularly, referring now to FIGS. 7-10, in one exemplary embodiment of this type the relative orientations of one or more additional mobile devices 702, 1004, 1005, 1006 in addition to the mobile device 102 with respect to a given coordinate system are determined and used by the mobile device 102 to govern its interaction in terms of determining whether each mobile device should be included or excluded in its communications with one or more of the other devices (e.g., in terms of data transfers, etc.). For purposes of this exemplary embodiment, it can be understood that each of the mobile devices 702, 1004, 1005, and 1006 is identical to the mobile device 102 as described above, although this need not be the case in other embodiments. In particular, for purposes of the present example, each of the mobile device 102, 702, 1004, 1005, 1006 includes at least one of an accelerometer and an electronic compass (e.g., the accelerometer 104 and/or the electronic compass 105) for monitoring its orientation along the coordinates of a coordinate system (which can be a shared coordinate system recognized by each of the devices) as well as an infrared proximity system. The use of the electronic compass in addition to an accelerometer can be particularly helpful where the orientation of the mobile device in relation to the north, south, east and west directions is of interest, rather than merely the orientation of the mobile device relative to the up/down (vertical) direction.

Figure 7:
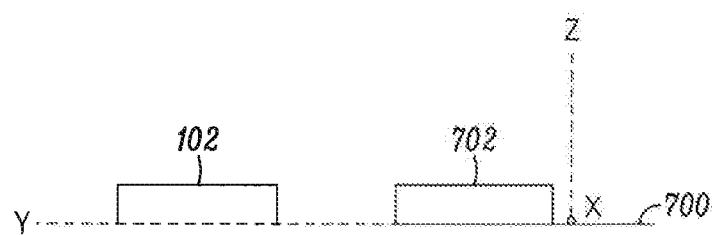
FIG. 7 is a side view of the mobile device of FIG. 1 along with a second exemplary mobile device situated in a flat orientation about a horizontal plane (X-Y plane)
Figure 8:
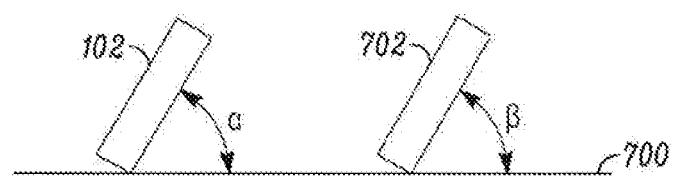
FIG. 8 is an additional side view of the mobile devices of FIG. 7, which are now shown to be situated in orientations that are rotated relative to the horizontal plane.
Figure 9:
FIG. 9 is another side view of the mobile devices of FIG. 7, where the first mobile device is orientated as shown in FIG. 8 while the second mobile device is orientated as shown in FIG. 7.
Figure 10:
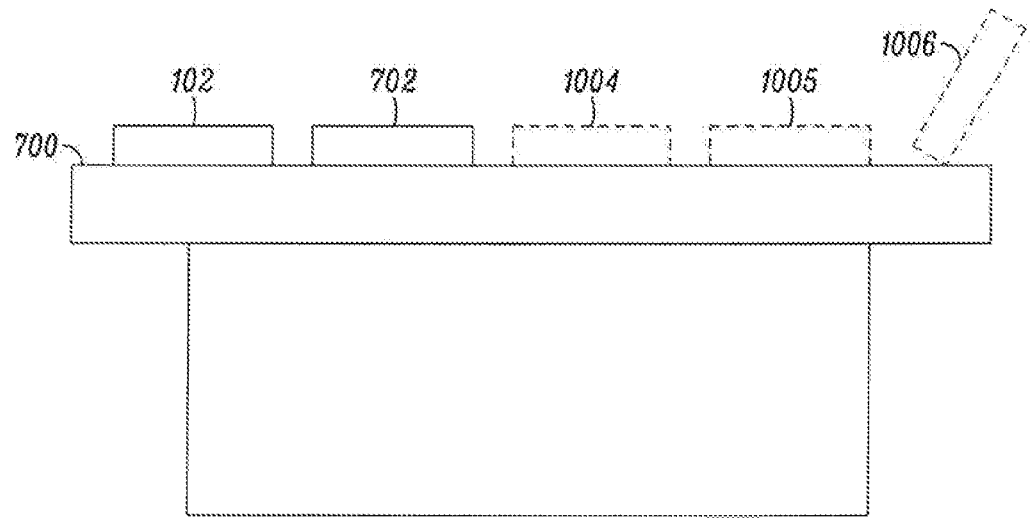
FIG. 10 is a further side view of the mobile devices of FIG. 7 now shown in conjunction with one or more additional mobile devices.

Referring still to FIGS. 7-10, side views along the X-axis are provided for two mobile devices 102, 702 in FIGS. 7-9 and then additionally for three mobile devices 1004, 1005, and 1006 in FIG. 10, with the mobile devices exhibiting various different rotational orientations in the different figures. More particularly, the mobile devices 102, 702 are both depicted in FIG. 7 as being orientated so as to be generally parallel to the X-Y plane defined by their common coordinate system. It will be understood that the X-Y plane could correspond to, or be parallel to, a flat surface such as a table top upon which the mobile devices 102, 702 are supported. By comparison, FIG. 8 depicts the mobile devices 102, 702 as depicted as being rotated by angles α and β in the z direction, respectively, about axes parallel to the X-axis relative to their orientations shown in FIG. 7. Despite the rotations shown, it will be noted that each of the mobile devices 102, 702 remain parallel to one another (albeit not parallel to the X-Y plane) and thus have the same orientation. As for FIG. 9, there the mobile device 102 remains rotated at the angle α relative to the horizontal orientation shown in FIG. 7, while the mobile device 702 has returned to the horizontal orientation shown in FIG. 7, and consequently the mobile devices 102, 702 shown in FIG. 9 do not share the same orientation. Finally, in FIG. 10 each of the mobile devices 102, 702, 1004, and 1005 are orientated in the same horizontal manner as shown in FIG. 7, while the mobile device 1006 is rotated away from horizontal by an angle.

Figure 11:
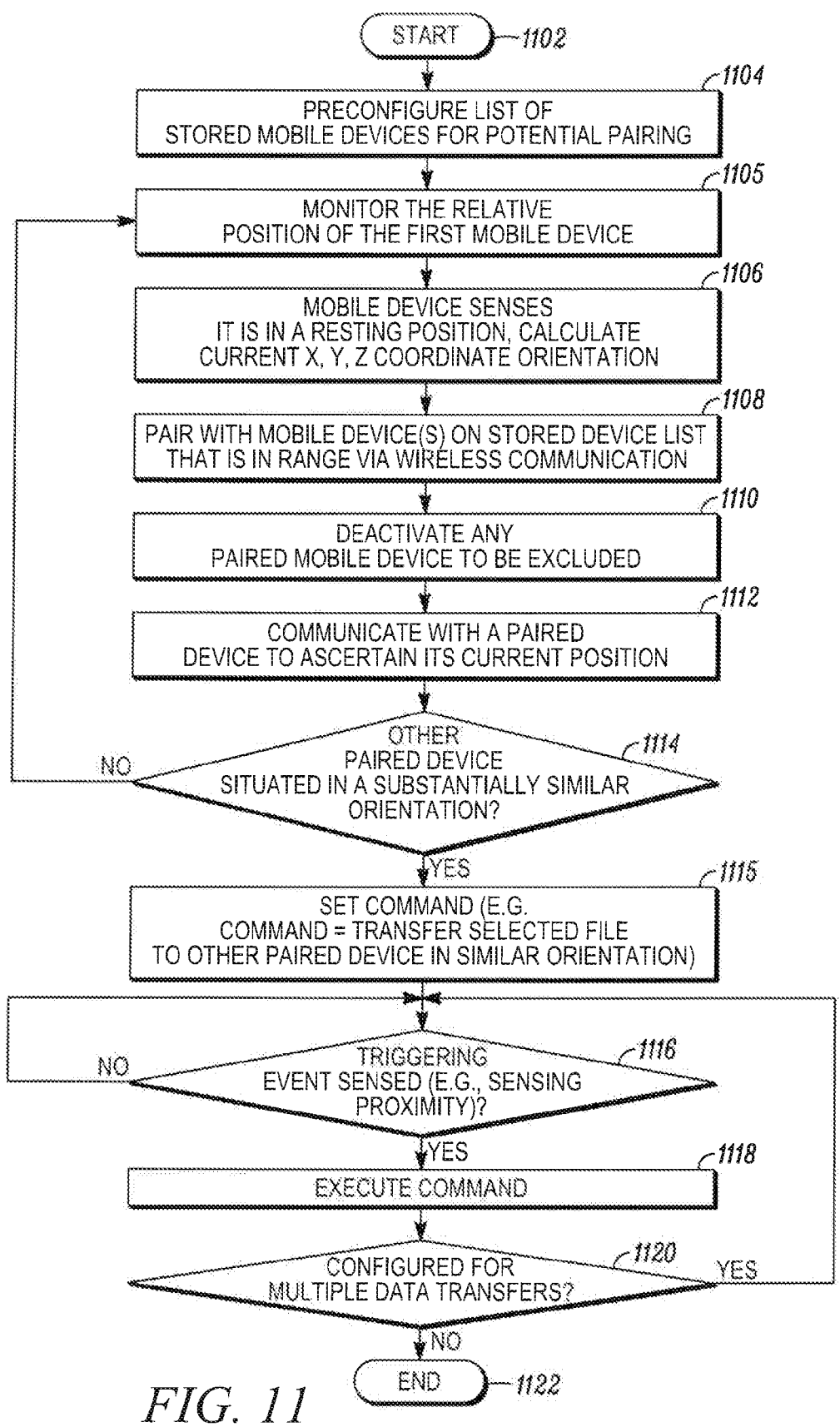
FIG. 11 is a flow chart illustrating exemplary steps pertaining to the interfacing of mobile devices situated in substantially similar and/or dissimilar orientations.

Referring to FIG. 11, the relative orientation of the mobile devices influences the manner in which the mobile devices 102, 702, 1004, 1005 and 1006 (shown in FIGS. 7-10), interact with one another. Although the steps of FIG. 11 are discussed below as being performed by the first mobile device 102, each of the other mobile devices 702, 1004, 1005, and 1006 can equally perform those steps. In the embodiment of FIG. 11, upon starting operation at step 1102, at step 1104 the first mobile device 102 is preconfigured with a list of additional mobile devices with respect to which it can potentially be paired. In addition, the first mobile device 102 at step 1105 monitors its own tilt and movement (static and dynamic accelerations) through the accelerometer 104. Next, at step 1106, the first mobile device 102 detects a resting orientation, where the mobile device tilt is measured by the accelerometer 104 along with a lack of acceleration as sensed by the accelerometer 104, signals the processor 204 (FIG. 2) to calculate the current orientation in Z of that mobile device. In the present embodiment, this current orientation is determined in relation to a shared reference point or at least shared reference plane that is common to all of the mobile devices 102, 702, 1004, 1005 and 1006, such as the horizontal X-Y plane. Upon determining this current orientation, the orientation information is stored in the memory 206 (see FIG. 2) of the first mobile device 102.

Further, at step 1108, the first mobile device 102 is then automatically paired to at least one mobile device to which the first mobile device 102 is capable of being paired and that was listed in the step 1104. In at least some embodiments, the mobile devices to which the first mobile device 102 can be paired are those devices that are sufficiently proximate to the first mobile device (within communication range i.e. Bluetooth®, etc.). For example, the first mobile device 102 can be paired with each of the other mobile devices 702, 1004, 1005 and 1006 shown in FIG. 10 by way of a communication link, such as Bluetooth®, peer-to-peer (P2P), ad hoc, etc., assuming that all of those other mobile devices are sufficiently close to the first mobile device 102 so as to be in communication range of the first mobile device. Notwithstanding the pairing that occurs in the step 1108, at a further step 1110 a listing of the mobile devices that have been paired with the first mobile device 102 is reviewed by the first mobile device and unwanted pairings can be deactivated (it is possible that in some instances one or more of the paired devices, even though listed on the preconfigured list of acceptable devices, should be decoupled from the first mobile device). For example, the mobile device 1005 of FIG. 10, despite being initially paired with the first mobile device 102 in the step 1108, can be manually decoupled from the first mobile device in the step 1110.

Next at step 1112, the first mobile device 102 communicates with the remaining paired mobile device(s) 702, 1004, 1006 to ascertain their orientations, using wireless communication links (again, for example, Bluetooth® links). It should be understood that, during this time, not only is the first mobile device 102 monitoring its own orientation by way of its sensors 231 (FIG. 2) (e.g. accelerometer 104 and electronic compass 105), but also similarly each of the other mobile devices 702, 1004, and 1006 with which the first mobile device is paired also have been monitoring their orientations (vis-à-vis the common reference frame) via their own sensors (not shown). Thus, at step 1112, upon request of the first mobile device 102, each of the other mobile devices 702, 1004, and 1006 is in a position to provide its respective current orientation, with respect to gravity for example, to the first mobile device.

Upon receiving current orientation information from the other mobile devices 702, 1004, 1006, at step 1114, the processor 204 in the first mobile device 102 then compares the detected orientation(s) of the paired mobile device(s) 702, 1004, 1006, with its own orientation to determine which devices are situated in the same or a substantially similar orientation. For example, with respect to FIG. 10 the mobile devices 702 and 1004 are in the same orientation as the mobile device 102, while the mobile device 1006 has a different orientation, while with respect to FIG. 8 the mobile device 702 is in substantially the same orientation as the mobile device 102 (it being understood that the angle α is approximately equal to the angle β), and with respect to FIG.

9 the mobile device 702 is in a substantially different orientation than the mobile device 102. Upon performing the comparisons at step 1114, the first mobile device 102 then utilizes the orientation information to govern further interactions between the first mobile device 102 and the other mobile devices 702, 1004, and 1006 with which it is paired.

For example, in at least some embodiments, once the mobile devices 102, 702, 1004 and 1006 are paired, a user can precipitate a file-sharing or data transfer event by which information (e.g., a document, text message, music file, etc.) is transmitted from the first mobile device 102 to appropriate ones of the other mobile devices 702, 1004, and 1006. The user causes this to occur by generating a triggering event. In at least some embodiments, the triggering event can include for example, sensing an object passing over the first mobile device 102, pushing a button on the device 102, moving the device in a certain direction, etc. In one embodiment, the object is passed over the first mobile device 102 such that, at step 1116, the first mobile device 102 senses presence of the object via the infrared proximity sensor and identifies the motion as a triggering event. The particular data for transfer can be specified by the user (or otherwise determined) in any of numerous ways. For example, the user can have highlighted a particular file shown in a list of such files on the screen 108 by scrolling to that file and pressing one of the buttons on the keypad 110. It should be noted that the transferring of data typically involves transmitting the data from the first mobile device 102 to others of the mobile devices without deleting the data stored at the first mobile device (e.g., copying of the data), albeit in other embodiments the data can be deleted at the first mobile device after being transmitted.

Continuing the process, upon the mobile device sensing the triggering event to transfer data, at step 1118 the first mobile device 102 executes the command to transmit data to the one or more other mobile devices that have been identified as being appropriately orientated. For example, referring to FIG. 10, if the first mobile device was configured to transfer data to only mobile devices substantially similarly oriented to the first mobile device 102, the mobile devices 702 and 1004 would receive the data transfer, but the mobile device 1006 would not receive the data due to its substantially dissimilar orientation. In at least some other embodiments, rather than selecting devices that have substantially similar orientations to itself, the first mobile device 102 instead can be configured to select specific orientations relative to the X, Y, or Z axes of other mobile devices that are dissimilar to its own. For example, assuming that the first mobile device 102 is oriented on a podium with an angle elevation α of about 45 degrees with respect to the horizontal, the first mobile device can determine the desired recipient mobile devices as being those mobile devices that are situated on a surface that is flat with respect to the horizontal, such as a desktop. Upon transferring of the data at step 1118, at step 1120 the first mobile device 102 then considers whether it is configured for multiple data transfers, which might occur for example upon a user waving at the first mobile device 102 repeatedly. If so, the process returns to the step 1116 (resulting in additional sensing of presence and additional transfers of data) while, if not, the process ends at step 1122.

Notwithstanding the above description, many other embodiments are possible as well. For example, in at least some other embodiments the sending of data from the first mobile device 102 to the other mobile devices 702, 1004, and 1006 (or other interactions between the first mobile device 102 and, the other mobile devices) at steps such as step 1118 of FIG. 11 is triggered not as a result of an object being sensed near the first mobile device but rather as a result of another triggering event. In some such embodiments, for example, the presence or movement of an object such as a user's hand (or other object or one or more object portions) in relation to the infrared proximity sensor 106 of the first mobile device 102 is detected by way of the sensor and in turn provides the triggering event for the data transfer. Additionally, in other such embodiments, the triggering event can include other inputs, such as pushing a button or creating a motion with the mobile device (e.g., twitching the mobile device). Further, in some such embodiments, the triggering of multiple data transfer events can occur respectively each time an object (such as a hand) passes the infrared proximity sensor 106. For example, with each triggering event, a subsequent file listed in a queue of files would be transferred.

From the above description it should be apparent that one or more of the methods and systems described herein can provide one or more advantages in terms of enhancing the performance of mobile device(s). In at least some of these embodiments, by providing a mobile device that utilizes an accelerometer and infrared proximity sensing information, a user is able to easily actuate a mobile device to operate itself, or operate in conjunction with one or more other mobile devices, without having to inconveniently fumble with as many small buttons or actuators on the mobile device, and in a manner that in many circumstances is intuitive. Further, in at least some embodiments, additional functions of the mobile device(s) are made available to a user.

It is specifically intended that the present invention not be limited to the embodiments and illustrations contained herein, but include modified forms of those embodiments including portions of the embodiments and combinations of elements of different embodiments as come within the scope of the following claims.

We claim:

1. A mobile device comprising:
a processor;
a wireless transceiver coupled to the processor;
an accelerometer coupled to the processor to provide an accelerometer signal to the processor indicative of a first orientation, first movement, or first acceleration of the mobile device; and
an infrared proximity sensor, coupled to the processor, for providing an infrared proximity sensor signal indicative of a presence of an object in proximity to the infrared proximity sensor,
wherein the processor determines based at least in part upon the accelerometer signal whether a first criterion has been met and, upon determining that the first criterion has been met, enters a first state in which the processor is prepared to execute a command upon receiving the infrared proximity sensor signal, and
wherein the processor, upon receiving the infrared proximity sensor signal while in the first state, executes the command.

2. The mobile device of claim 1, wherein the command relates to either (a) changing a display characteristic of a display on the mobile device, or (b) causing transmission of data from the mobile device to a remote location.

3. A system comprising the mobile device of claim 1 and further comprising an additional mobile device, wherein the processing determines whether the first criterion has been met based upon both the accelerometer signal and an additional signal received from the additional mobile device that is indicative of a second orientation of the additional mobile device, and wherein whether the first criterion is met depends upon a degree to which the first orientation is similar angularly to the second orientation.

4. The mobile device of claim 1, wherein the processor causes repeated execution of the command upon receiving the infrared proximity sensor signal repeatedly.

5. The mobile device of claim 1, further comprising an electronic compass coupled to the processor to provide a third signal to the processor.

6. The mobile device of claim 5, wherein the third signal is further indicative of the first orientation of the mobile device; and wherein the processor determines based at least in part upon the accelerometer signal and the third signal whether the first criterion has been met.

7. A first mobile device comprising:
a processor;
a wireless transceiver coupled to the processor;
an accelerometer that is a component of the first mobile device and that is coupled to the processor to provide an accelerometer signal to the processor indicative of a first angular orientation of the first mobile device; and
an infrared proximity sensor, coupled to the processor, for providing an infrared proximity sensor signal indicative of a presence of an object in proximity to the infrared proximity sensor,
wherein the processor determines, based at least in part upon the accelerometer signal and an additional signal received from an additional mobile device that is indicative of an additional angular orientation of the additional mobile device, whether a first criterion has been met depending upon a degree to which the first angular orientation is similar to the additional angular orientation, wherein the first mobile device and additional mobile device are paired with one another,
wherein, upon determining that the first criterion has been met, the processor enters a first state in which the processor is prepared to execute a command causing transmission of data from the first mobile device to the additional mobile device upon receiving the infrared proximity sensor signal, and
wherein the processor, upon receiving the infrared proximity sensor signal, executes the command.

8. The mobile device of claim 7, wherein the transmission of data is to the additional mobile device because the additional mobile device has been identified as being substantially similarly orientated relative to the first mobile device, but not to a further mobile device that is substantially dissimilarly orientated relative to the first mobile device.

9. The mobile device of claim 8, wherein the processor causes repeated execution of the command upon receiving the infrared proximity sensor signal repeatedly.

10. The mobile device of claim 9, further comprising an electronic compass coupled to the processor to provide a third signal to the processor, wherein the third signal is further indicative of the orientation of the mobile device; and wherein the processor determines based at least in part upon the accelerometer signal and the third signal whether the first criterion has been met.

* * * * *